United States Patent [19]

Yoshimi et al.

[11] Patent Number: 4,919,575
[45] Date of Patent: Apr. 24, 1990

[54] APPARATUS FOR COMPENSATING FOR THE THERMAL DISPLACEMENT OF THE MAIN SPINDLE OF A MACHINE TOOL

[75] Inventors: Takani Yoshimi, Gamagori; Akihiro Matsuura, Chiryu; Toshiharu Takashima, Kariya; Hiroyuki Nakano, Tokai, all of Japan

[73] Assignee: Toyoda Koki Kabushiki Kaisha, Kariya, Japan

[21] Appl. No.: 352,470

[22] Filed: May 16, 1989

[30] Foreign Application Priority Data

May 20, 1988 [JP] Japan .................................. 63-123567
May 20, 1988 [JP] Japan .................................. 63-123568

[51] Int. Cl.[5] .......................... B23C 1/06; B23B 39/08; G05B 19/18
[52] U.S. Cl. .................................... 409/231; 318/634; 364/474.35; 408/11; 408/13
[58] Field of Search ............... 409/231, 232, 239, 235, 409/135, 132; 408/11, 13, 238; 318/471, 634; 364/474.34, 474.35; 51/166 MH, 165.73

[56] References Cited

U.S. PATENT DOCUMENTS

| | | | |
|---|---|---|---|
| 3,045,510 | 7/1962 | Brainard | 409/239 X |
| 3,221,605 | 12/1965 | Hemmerle et al. | 409/239 |
| 4,382,215 | 5/1983 | Barlow et al. | 364/474.34 X |
| 4,471,443 | 9/1984 | Kinoshita et al. | 364/474.35 |
| 4,553,858 | 8/1985 | Tlaker | 318/471 X |
| 4,808,048 | 2/1989 | Miller | 409/239 |

FOREIGN PATENT DOCUMENTS

| | | | |
|---|---|---|---|
| 3151750 | 7/1982 | Fed. Rep. of Germany | 364/474.35 |
| 50-130081 | 10/1975 | Japan . | |
| 51-75274 | 6/1976 | Japan . | |
| 53-57577 | 5/1978 | Japan . | |
| 123674 | 9/1979 | Japan | 318/634 |
| 197346 | 10/1985 | Japan | 364/474.35 |
| 62-40751 | 1/1987 | Japan . | |

Primary Examiner—William Briggs
Attorney, Agent, or Firm—Oblon, Spivak, McClelland, Maier & Neustadt

[57] ABSTRACT

A thermal displacement compensating apparatus capable of compensating for the thermal displacement of the main spindle of a machine tool is disclosed. A feed back scale and a measuring head are provided in order to detect the actual position of the front end portion of the spindle head. Furthermore, a distance sensor is provided for detecting the thermal extension of the main spindle with respect to the spindle head. The output signal from the distance sensor is used for modifying the present position detected by the measuring head or modifying a commanded target position. With this arrangement, a tool attached to the front end portion of the main spindle is moved to the commanded position regardless of the thermal displacement of the spindle head and the main spindle. Another type of compensation apparatus is also disclosed, wherein the measuring head is mounted on a mounting rod, and the mounting rod is automatically moved so as to maintain the distance between the measuring head and the front end surface of the main spindle at a constant distance. With this arrangement, actual position of the front end surface of the main spindle can directly be detected regardless of the thermal displacement of the spindle head and the main spindle.

10 Claims, 5 Drawing Sheets

APPARATUS FOR COMPENSATING FOR THE THERMAL DISPLACEMENT OF THE MAIN SPINDLE OF A MACHINE TOOL

BACKGROUND OF THE INVENTION

1. Field of the Invention

The present invention relates to an apparatus capable of compensating for the thermal displacement of the main spindle of a machine tool, wherein the final position of the main spindle is compensated for the thermal displacement of the main spindle and the spindle head.

2. Description of the Prior Art

In the past, a few kinds of compensating apparatus capable of compensating thermal displacement of a spindle head were proposed.

For example, the U.S. Pat. No. 3,045,510 discloses a compensating apparatus, wherein a detecting bar formed of temperature stable material is attached to the front end portion of a spindle head, and the rear end of the detecting bar is engaged with a differential syncro in order to detect the axial movement of the detecting bar. The output signal of the differential syncro is fed to a position control system so as to modify the final position of the spindle head. In the compensating apparatus described above, the output signal of the differential syncro is in proportion to the thermal displacement of the front end portion of the spindle head. Accordingly, the feed amount of the spindle is compensated for the thermal displacement of the spindle head so that the machining accuracy of workpieces machined with a tool carried by the main spindle is improved.

Generally a spindle head thermally extends and contracts with respect to a ball nut mounting surface at which a ball nut is attached in order to transmit the driving power generated by a feed motor. Furthermore, the main spindle also thermally extends and contracts with respect to the spindle bearing which supports the main spindle on the spindle head. Accordingly, the front end portion of the main spindle is displaced with respect to the ball nut mounting surface by the amount which is total of the thermal displacement of the spindle head and the thermal displacement of the main spindle. However, the compensating apparatus described above can compensate for only the thermal displacement of the spindle head. Accordingly, it can not improve the machining accuracy to a sufficient level.

SUMMARY OF THE INVENTION

Accordingly, it is an object of the present invention to provide an improved compensating apparatus capable of compensating the thermal displacement of a main spindle which occurs due to the thermal extention and contraction of both the spindle head and the main spindle itself.

Another object of the invention is to provide an improved compensating apparatus with a sensing mechanism which is able to accurately detect the position of the front end portion of a main spindle regardless of the thermal extension and contraction of both the spindle head and the main spindle itself.

Another object of the invention is to provide an improved compensating apparatus with a sensing mechanism which is able to detect the thermal displacement of a main spindle with respect to the spindle head supporting the main spindle.

Briefly, according to the present invention, there is provided a compensating apparatus capable of compensating for the thermal displacement of the main spindle of a machine tool. A feed back scale and a measuring head are provided for measuring the position of the front end portion of the spindle head. For example, the feed back scale is fixed on a frame which slidably supports the spindle head, and the measuring head is attached to the spindle head at the front end portion of the spindle head. With this arrangement, the actual position of the front end portion of the spindle head can be measured regardless of the thermal displacement of the spindle head. Thermal displacement detecting means is also provided in the spindle head for measuring the amount of the thermal displacement of the main spindle with respect to the spindle head. While numerical control means drives a servomotor in such a way that the front end portion of the spindle head is moved to a final position corresponding to a commanded target position, the final position is sifted based upon the detected thermal displacement of the main spindle. Namely, the detected present position of the spindle head or the target position is compensated with the detected thermal displacement of the main spindle so that a tool attached to the front end portion of the main spindle is moved to the commanded target position.

According to another aspect of the invention, the measuring head is mounted on a mounting bar having a low thermal expansion coefficient. The mounting bar is automatically moved in such a way that the positional relationship between the measuring head and the front end portion of the main spindle is maintained constant. With this arrangement, the measuring head can measure the actual position of the front end portion of the main spindle regardless of the thermal displacement of the spindle head and the main spindle. Accordingly, the tool can be moved to a commanded position regardless of those thermal displacements.

BRIEF DESCRIPTION OF THE ACCOMPANYING DRAWINGS

Various other objects, features and attendant advantages of the present invention will readily be appreciated as the same becomes better understood by reference to the following detailed description of preferred embodiments when considered in connection with the accompanying drawings, in which.

DETAILED DESCRIPTION OF THE PREFERRED EMBODIMENTS

Figure 1:
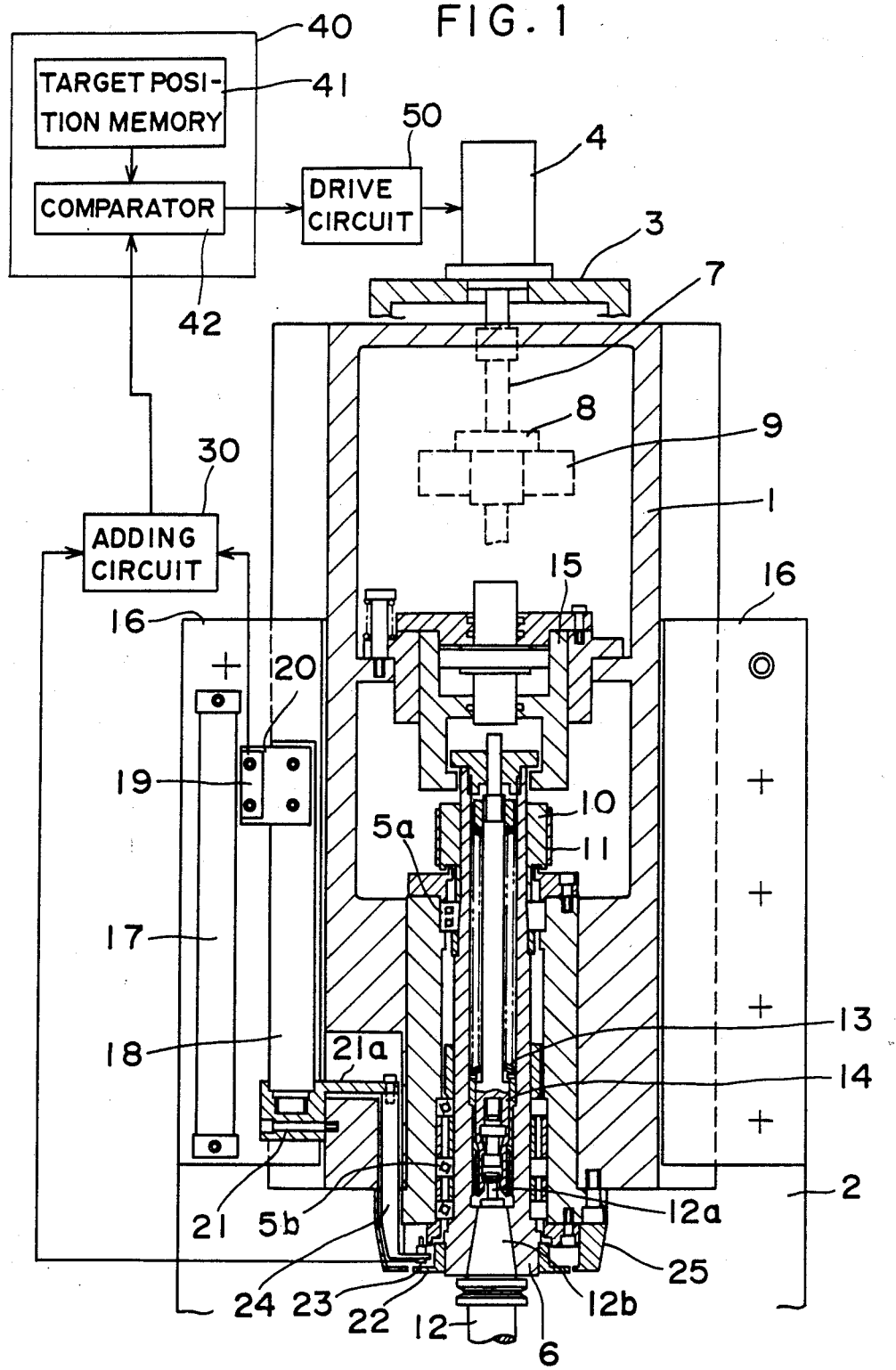
FIG. 1 is a sectional view showing a spindle head and a block diagram of a control circuit according to a first embodiment of the present invention.
Figure 2:
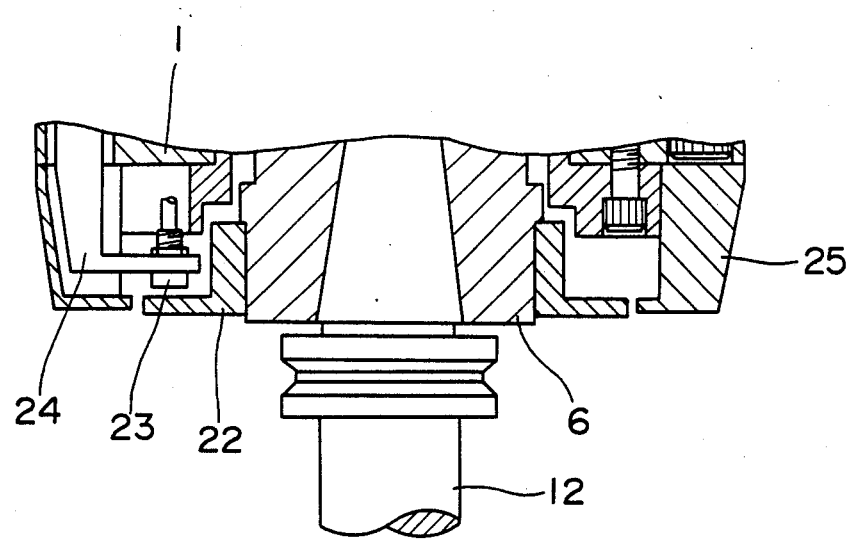
FIG. 2 is an enlarged sectional view of the thermal displacement detecting mechanism shown in FIG. 1.

Referring now to the drawings and particularly to FIGS. 1 and 2 thereof, there is shown a spindle head 1 of a vertical type machine tool, which is guided on a column 2 for a vertical sliding movement. A servomotor 4 for moving the spindle head 1 is secured on a motor base 3 fixed on the column 2. A main spindle 6 is supported by an upper bearing 5a and a lower bearing 5b so as to be rotatable but to be prohibited from the axial movement. A feed screw 7 is connected to the output shaft of the servomotor 4, and the feed screw 7 is engaged with a ball nut 8 through balls (not shown). The ball nut 8 is attached to the ball nut mounting surface of an engaging portion 9 secured to the spindle head 1.

A driven pulley 10 is secured to the upper end portion of the main spindle 1, and the rotational power is transmitted from the main spindle motor (not shown) fixed on the spindle head 1 to the driven pulley 10 through a drive pulley (not shown) and an endless belt 11. The spindle 6 is formed with a cylindrical bore, and the shank portion 12b having a pull stud 12a of a tool 12 is removablely attached to the front portion of the bore. With this arrangement, the tool is projected from the front end surface of the main spindle 6. A large number of washer springs 13 and a tool pushing rod 14 urged by the washer springs are received in the bore of the main spindle 6 located above the tool 12. A cylinder 15 for unclamping the tool 12 is attached at the upper portion of the spindle head 14.

A feed back scale 17 is vertically secured on one side of the column 2 through a back plate 16 so as to be located close to the spindle head 1. In the space between the feed back scale 17 and the spindle head 1, a measuring head mounting rod 18 is arranged parallel to the scale 17. A measuring head 19 is mounted on the rear end portion of the mounting rod 18 through a mounting plate 20 in such a way that the measuring head 19 is magnetically engaged with the feed back scale 17. The front end portion of the mounting rod 18 is fixed to a fixation bracket 21 attached to one side of the front end portion of the spindle head 1.

At the front end portion of the spindle head 1, a thermal displacement detecting mechanism for detecting the thermal displacement of the main spindle 6 is provided. Namely, a detecting ring 22 is attached to the outer surface of the front end portion of the main spindle 6, and a non-contact distance sensor 23 is arranged at the front end portion of the spindle head 1 in such a way that the front surface of the distance sensor 23 is located close to the back surface of the detecting ring 22. The distance sensor 23 is attached to the inner end of the horizontal portion of an L-shaped mounting bracket 24, and the upper end of the vertical portion of the mounting bracket 24 is fixed to the projection portion 21a of the fixation bracket 21. The projection portion 21a is projected toward inside of the spindle head 1 in such a way that the mounting bracket 24 is located in the same vertical plane as the mounting rod 18 is located. All of the mounting rod 18, the mounting plate 20, the fixation bracket 21 and the mounting bracket 24 are made of material having a low thermal expansion coefficient. Furthermore, a cover 25 which covers the mounting bracket 24 is provided between the outer surface of the detecting ring 22 and the front end surface of the spindle head 1, and is fixed to the spindle head 1.

The measuring head 19 and the distance sensor 23 are connected to an adding circuit 30. The adding circuit 30 adds the output signal of the distance sensor 23 to the present position signal output by the measuring head 19, and outputs an absolute position signal to a comparator 42 in a numerical control apparatus 40. The comparator 42 compares the absolute position signal with an absolute target position signal read out from a target position memory so as to output a command signal proportional to the difference between the present position and the target position. The command signal is fed to a drive circuit 50 in order to drive the servomotor 4. As a result, the spindle head 1 is moved with respect to the column 2 to the compensated final position which is compensated for the thermal displacement of both the spindle head 1 and the main spindle 6.

In the above described machine tool, the spindle head 1 and the main spindle 6 thermally extend in the vertical direction during the machining operation so that the positions of the front end portion of both the spindle head 1 and the main spindle 6 are displaced downwardly. Even under this condition, the actual present position of the front end portion of the main spindle 6 can be detected by the measuring head 19, the distance sensor 23 and the adding circuit 30. Namely, since the measuring head 19 is secured on the rear portion of the mounting rod 18 having low thermal expansion coefficient, and the front end portion of the mountion rod 18 is secured to the front end portion of the spindle head 1, the present position of the front end portion of the spindle head 1, can be detected by the measuring head 19 regardless of the thermal extention of the spindle head 1. Furthermore, the thermal extention of the main spindle 6 with respect to the front end portion of the spindle head 1 can be detected by the distance sensor 23, because the distance sensor 23 is mounted to the front end portion of the spindle head 1 through the fixation bracket 24, and the mounting bracket 24 is also made of the material having the low thermal expansion coefficient. The output signal of the distance sensor 23 indicating the detected thermal displacement of the main spindle 6 is fed to the adding circuit 30 so that the adding circuit 30 outputs the compensated absolute position signal which indicates the actual position of the front surface of the main spindle 6. This absolute signal is fed to the comparator 42 so as to be compared with the target position signal read out from the target position memory 41. As a result, the servomotor 4 is driven in accordance with the difference between the actual position of the front end portion of the main spindle 6 and the target position so that the tool 12 is accurately moved to a commanded position.

Figure 3:
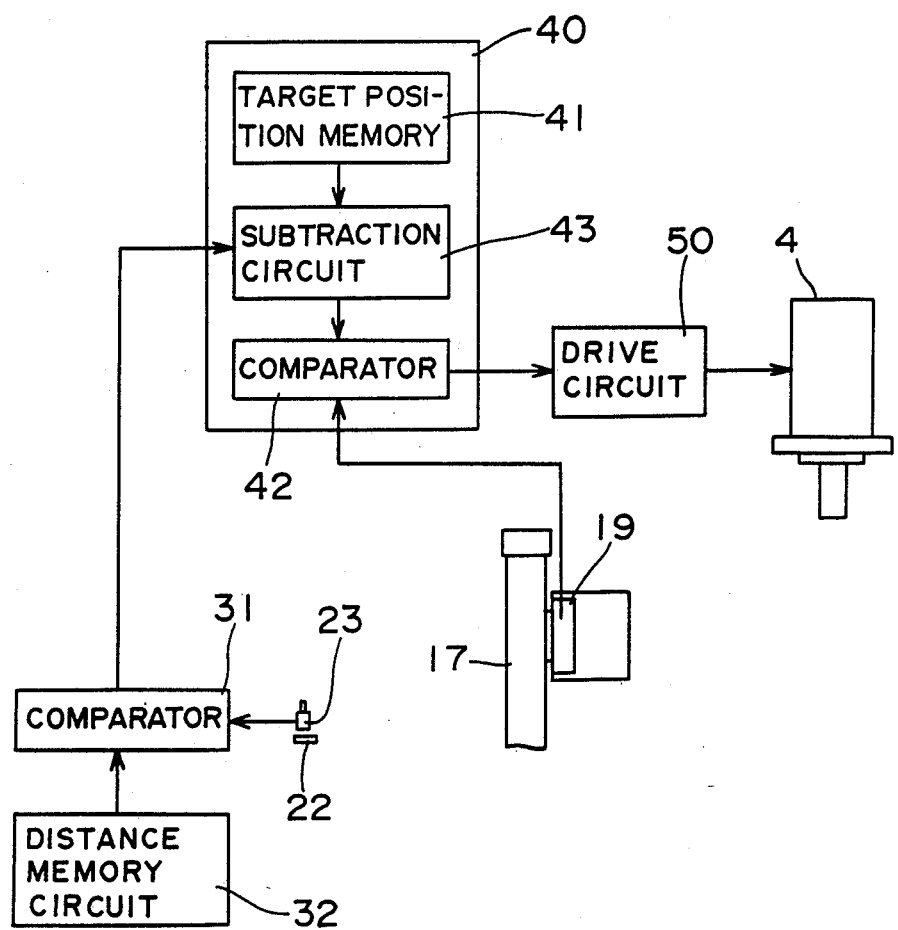
FIG. 3 is a block diagram of a control circuit according to a second embodiment of the present invention.

FIG. 3 shows a second embodiment of the present invention, in which the target position data is compensated depending upon the detected thermal displacement of the main spindle 6. Namely, the output signal of the distance sensor 23, which indicates the detected actual distance between the detecting ring 22 and the distance sensor 23, is fed to a comparator 31 so as to be compared with a theoretical distance stored in a distance memory circuit 32. The comparator 31 calculates the difference between the detected actual distance and the theoretical distance, i.e. the amount of the thermal displacement of the main spindle 6 with respect to the spindle head 1. The output signal of the comparator 31 is fed to a subtraction circuit 43 provided in the numerical control apparatus 40 in order to compensate the target position read out from the target position memory 41. As a result, the target position is sifted by the distance equal to the thermal displacement of the main spindle 6. On the other hand, the output signal from the measuring head 19 indicates the actual absolute position of the front end portion of the spindle head 1. Accordingly, the servomotor 4 is moved in such a way that the front end portion of the spindle head 1 is located at the sifted target position. With this movement, the front end surface of the main spindle 6, i.e. the tool 12 is moved to the commanded target position regardless of the thermal displacement of the spindle head and the main spindle.

While the mounting bar 18 and the mounting bracket 24 are attached to the front end portion of the spindle head 1 through the fixation bracket 21 in the first and second embodiments described above, the mounting bar 18 and the mounting bracket 24 can directly be attached to the spindle head in the same horizontal plane if there is enough mounting space.

Figure 4:
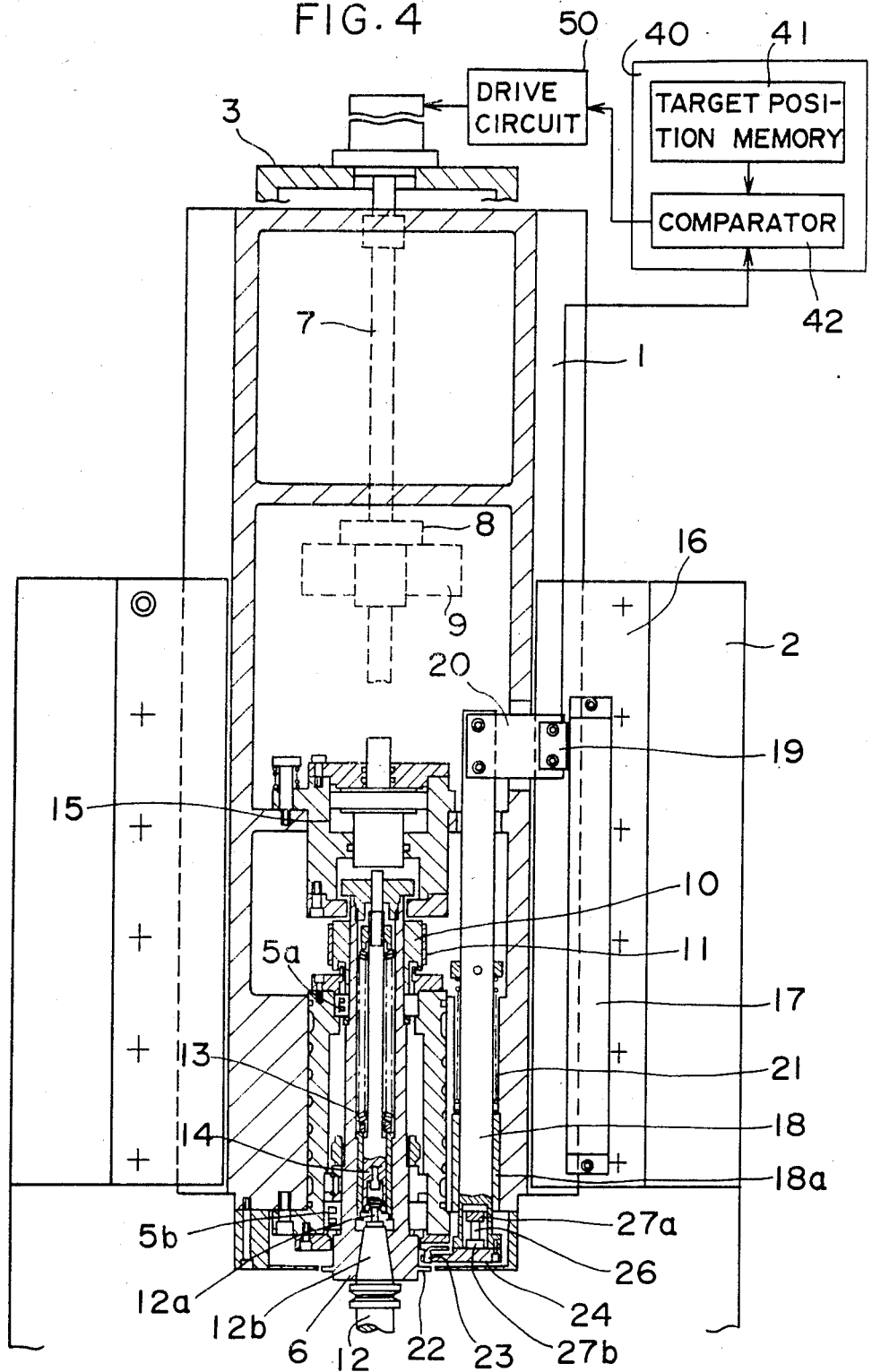
FIG. 4 is a sectional view showing the spindle head and a block diagram of a control circuit according to a third embodiment of the present invention.
Figure 5:
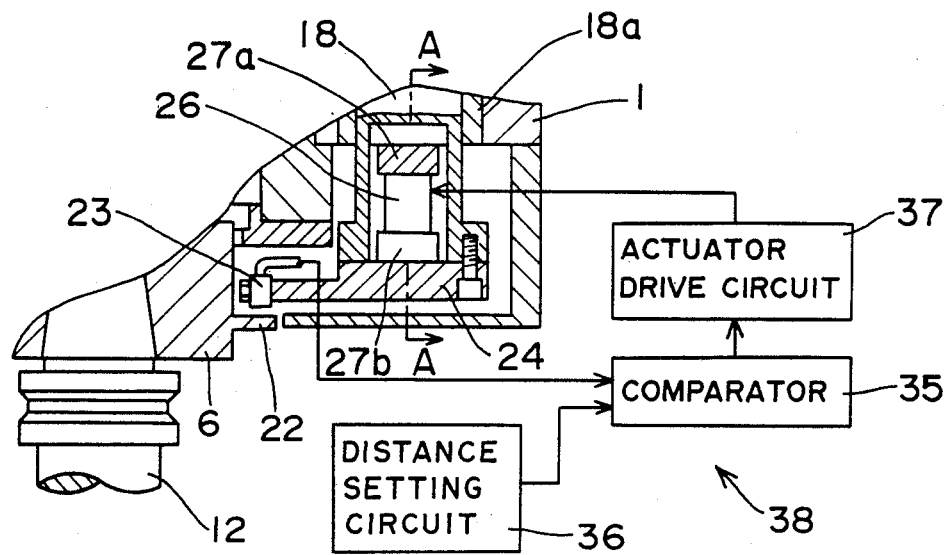
FIG. 5 is an enlarged sectional view of the distance detecting mechanism shown in FIG. 4 with a block diagram of a distance control circuit.
Figure 6:
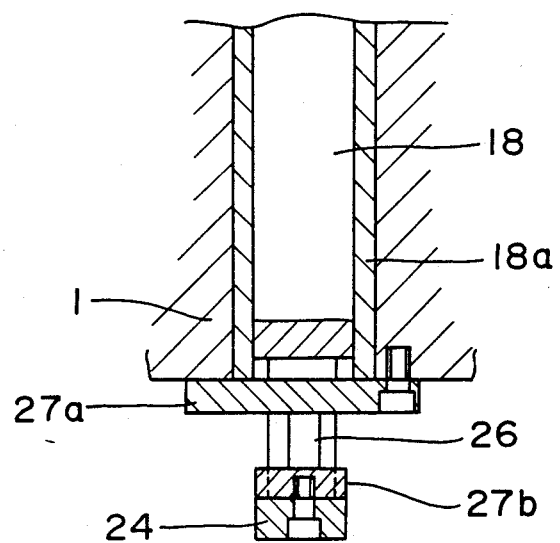
FIG. 6 is an enlarged sectional view taken along the lines A—A in FIG. 5.

FIGS. 4 through 6 show a third embodiment of the present invention. In this embodiment, a mounting rod 18 supporting the measuring head 19 is slidably supported on the spindle head 1, and is urged upwardly by a coil spring 21 supported by a rod guide 18a. The lower end portion of the mounting rod 18 is projected from the front end surface of the spindle head 1, and the base portion of a distance sensor mounting bracket 24 is secured on the lower end surface of the mounting rod 18. A distance sensor 23 for detecting the distance between the distance sensor 23 and the main spindle 6 is fixed on the front end of the mounting bracket 24. An upper mounting plate 27a is fixed on the front end surface of the spindle head 1, and a lower mounting plate 27b, which faces to the upper mounting plate 27a, is fixed on the upper surface of the base portion of the mounting bracket 24. A piezoelectric actuator 26 is attached between the upper mounting plate 27a and the lower mounting plate 27b so that the lower mounting plate 27b is hung down from the upper mounting plate 27a through the actuator 26. Since the front end portion of the mounting rod 18 is fixed to the lower mounting plate 27b through the mounting bracket 24, the mounting rod 18 is vertically moved by the piezoelectric actuator 26. All of the mounting rod 18, the mounting plate 20, the mounting bracket 24, the upper mounting plate 27a and the lower mounting plate 27b are made of the material having a low expansion coefficient.

The distance sensor 23 is connected to a comparator 35 of a position control circuit 38 so as to feed the output signal thereof to the comparator 35. The comparator 35 compares the output signal indicating the detected distance with the predetermined setting signal output from a distance setting circuit 36 so as to output the command signal to an actuator drive circuit 37. With this arrangement, the mounting rod 18 is moved in such a way that the distance between the distance sensor 23 and the detecting ring 22 is maintained at the predetermined constant distance.

In the spindle head in the third embodiment, the distance between the distance sensor 23 and the detecting ring 22 becomes large when the main spindle 6 thermally extends during the machining operation. When the distance becomes larger than the predetermined distance, the comparator 35 outputs a predetermined voltage signal to the piezoelectric actuator 26 in order to maintain the distance between the distance sensor 23 and the detecting ring 22 at the constant distance. With this operation, the measuring head 19 mounted on the mounting rod 18 is moved downwardly. This mounting rod 18 is also moved downwardly in accordance with the thermal extention of the spindle head 1 since the mounting rod 18 is supported on the front end portion of the spindle head 1 through the upper mounting plate 27a, the piezoelectric actuator 26 and the lower mounting plate 27b. Accordingly, the measuring head 19 has a constant positional relationship with the front end portion of the main spindle 6, and the measuring head 19 can measure the actual position of the front end portion of the main spindle 6. The output signal of the measuring head 19 is fed to the comparator 42 of the numerical control apparatus 40. With this arrangement, the front end portion of the main spindle, i.e. the tool 12 is moved to a commanded position, because the output signal from the measuring head 19 indicates the actual present position of the front end portion of the main spindle 6.

While the feed back scale 17 is attached to the column 2, and the measuring head 19 is attached to the spindle head 1 in the above mentioned embodiments, the measuring head 19 can be attached to the column 2, and the feed back scale 17 can be attached to the spindle head 1.

Furthermore, this invention can be applied to other kinds of machine tools in which spindle heads are supported on frames excepting columns.

Obviously, numerous modifications and variations of the present invention are possible in light of the above teachings. It is therefore to be understood that within the scope of the appended claims, the invention may be practiced otherwise than as specifically described herein.

What is claimed is:

1. A compensating apparatus capable of compensating for the thermal displacement of a main spindle supported on a spindle head which is movably guided on a frame of a machine tool, and is moved by a servomotor, wherein said compensating apparatus comprises:
   a feed back scale and a measuring head disposed between said frame and the front end portion of said spindle head, said measuring head electrically engaging with said feed back scale and outputting a signal which indicates the present position of said front end portion of said spindle head;
   thermal displacement measuring means attached to said front end portion of said spindle head for detecting the thermal displacement of the front end portion of said main spindle with respect to said spindle head;
   numerical control means for comparing the present position of said front end portion of the spindle head detected by said measuring head with a command target position, and for driving said servomotor in accordance with the difference between the present position of the front end portion of said spindle head and said target position so that the front end portion of said spindle head is moved to a final position corresponding to said commanded target position; and
   compensating means for shifting said final position depending upon the thermal displacement of said main spindle so as to move the front end portion of said main spindle to said commanded target position.

2. A compensating apparatus as set forth in claim 1, wherein said compensating means comprises adding means for adding the output signal of said thermal displacement measuring means to the output signal of said measuring head to produce a compensated present position signal to said numerical control means.

3. A compensating apparatus as set forth in claim 2, wherein said feedback scale is secured on said frame, and said measuring head is secured at the front end portion of said spindle head through a mounting rod having a low thermal expansion coefficient.

4. A compensating apparatus as set forth in claim 3, wherein said thermal displacement detecting means comprises a detecting ring fromed on the outer surface of the front end portion of said main spindle and a distance sensor attached to the front end protion of said spindle head through a mounting bracket having a low thermal expansion coefficient for measuring the distance between said distance sensor and said detecting ring.

5. A compensating apparatus as set forth in claim 1, wherein said compensation means comprises subtraction means for subtracting the output signal of said thermal displacement measuring means from the target position signal to produce a compensated target position signal.

6. A compensating apparatus as set forth in claim 5, wherein said feedback scale is secured on said frame, and said measuring head is secured at the front end portion of said spindle head through a mounting rod having a low thermal expansion coefficient.

7. A compensating apparatus as set forth in claim 6, wherein said thermal displacement detecting means comprises a detecting ring formed on the outer surface of the front end portion of said main spindle and a distance sensor attached to the front end portion of said spindle head through a mounting bracket having a low thermal expansion coefficient for measuring the distance between said distance sensor and said detecting ring.

8. A compensating apparatus capable of compensating for the thermal displacement of a main spindle supported on a spindle head which is movablely supported on a frame of a machine tool, and is moved by a servomotor, wherein said compensating apparatus comprises:

a feed back scale secured on said frame, said feed back scale being extended along a direction parallel to the movement direction of said spindle head;

a mounting rod having a low thermal expansion coefficient supported on said spindle head so as to be movable along a direction parallel to said feed back scale;

a measuring head secured on said mounting rod so as to magnetically engage with said feed back scale;

actuator means for adjusting the axial position of said mounting rod;

distance measuring means for detecting the distance between the front end portion of said mounting rod and the front end surface of said main spindle;

distance control means for driving said actuator means according to the difference between the measured distance and a predetermined distance so as to maintain the distance between the front end portion of said mounting rod and the front end surface of said main spindle at said predetermined distance; and a numerical control means for comparing the present position of said front end portion of said main spindle detected by said measuring head with a command target position, and for driving said servomotor in accordance with the difference between the present position of the front end portion of said main spindle and said target position so as to move the front end portion of said main spindle to a final position corresponding to said commanded target position.

9. A compensating apparatus as set forth in claim 8, wherein said actuator means comprises a mounting plate fixed on the front end surface of said spindle head, a mounting bracket fixed on the front end portion of said mounting rod and a piezoelectric actuator disposed between said mounting plate and said mounting bracket.

10. A compensating apparatus as set forth in claim 9, wherein said distance detecting means comprises a detecting ring formed on the outer surface of the front end portion of said main spindle and a distance sensor mounted on said mounting bracket.

* * * * *